United States Patent [19]

Modesette

[11] 4,063,773

[45] Dec. 20, 1977

[54] AIR DEFLECTOR

[76] Inventor: J. Harley Modesette, 1047 Country Club Drive, West Plains, Mo. 65775

[21] Appl. No.: 710,011

[22] Filed: July 30, 1976

[51] Int. Cl.² .............................................. B60J 1/20

[52] U.S. Cl. ....................................... 296/91; 296/1 S

[58] Field of Search ................................... 296/1 S, 91

[56] References Cited

U.S. PATENT DOCUMENTS

| | | | |
|---|---|---|---|
| 2,338,199 | 1/1944 | Parke | 296/91 |
| 3,514,023 | 5/1970 | Russell | 296/1 S |
| 3,574,392 | 4/1971 | Hirano | 296/91 |

FOREIGN PATENT DOCUMENTS

| | | | |
|---|---|---|---|
| 1,564,532 | 3/1969 | France | 296/91 |

*Primary Examiner*—Philip Goodman

*Attorney, Agent, or Firm*—Koenig, Senniger, Powers and Leavitt

[57] ABSTRACT

An air deflector for deflecting airborne particles, such as dust, rain, insects, road spray and the like, clear of the windshield of a vehicle comprising a member of channel-shaped in cross section having a substantially planar web and side portions. The member is adapted to be mounted in inverted position on the hood of the vehicle with the side flanges engaging the hood and extending generally longitudinally thereof with the front and rear edges of the web extending transversely of the hood and with the rear edge being spaced above the hood so that the web constitutes a ram angling upwardly from front to rear whereby as the vehicle is driven forwardly airborne particles are deflected by the web up over the windshield.

4 Claims, 8 Drawing Figures

W
11
1
9
7
9
11
1
13
13
3
5

W
5
1
9
11
3
13

20
1
9
11
19
13
13
15

20'
11'
1'
9'
13'
13'
8
8
17

11
1
19
13
13
20
9

9
15
1

17
11'

11
21
19
23
25
20

AIR DEFLECTOR

BACKGROUND OF THE INVENTION

This invention relates to an air deflector for an automobile, pickup truck, truck, boat, and other vehicles for deflecting airborne particles (e.g., dust, rain, insects, road spray, and the like) clear of the windshield of the vehicle and more particularly to an air deflector which is adapted to be mounted on the forward portion of a hood of the vehicle for deflecting the airstream flowing over the hood upwardly over the windshield thereby preventing impingment of airborne particles on the windshield.

Reference may also be made to U.S. Pats. Nos. 2,184,798, 2,823,072, 3,214,215 and 3,817,572 which illustrate vehicle mounted air deflectors and air scoops in the same general field as the air deflector of the present invention.

SUMMARY OF THE INVENTION

Among the several objects of this invention may be noted the provision of an air deflector readily and removably securable to the forward portion of the hood of a vehicle without substantial modification or damage to the vehicle; the provision of such a deflector which effectively deflects airborne particles clear of the windshield; the provision of such a device which increases wiper blade operation; the provision of such an air deflector which generally does not obstruct the driver's view of the road; and the provision of such a deflector which is simple in design for economical production, which is sturdily constructed, and which has a long service life.

Briefly, a deflector of this invention deflects airborne particles (e.g., dust, rain, insects, road spray and the like) clear of the windshield of a vehicle and it comprises a member of channel-shape in cross section having a substantially planar web and side flanges. The member is adapted to be mounted in inverted position of the hood of a vehicle with the side flanges engaging the hood and extending generally longitudinally thereof with one edge of the web constituting a front edge extending transversely of the hood and spaced above the hood so that the web constitutes a ramp sloping upwardly from front to rear. This ramp is positioned on the hood and angled at such a slope that a projection of the plane of the ramp extends up over the top of the windshield whereby as the vehicle is driven forward the airborne particles are deflected by the web up over the windshield.

Other objects and features of this invention will be in part apparent and in part pointed out hereinafter.

BRIEF DESCRIPTION OF THE DRAWINGS

Corresponding reference characters indicate corresponding parts throughout the several views of the drawing.

DESCRIPTION OF PREFERRED EMBODIMENTS

Figure 1:
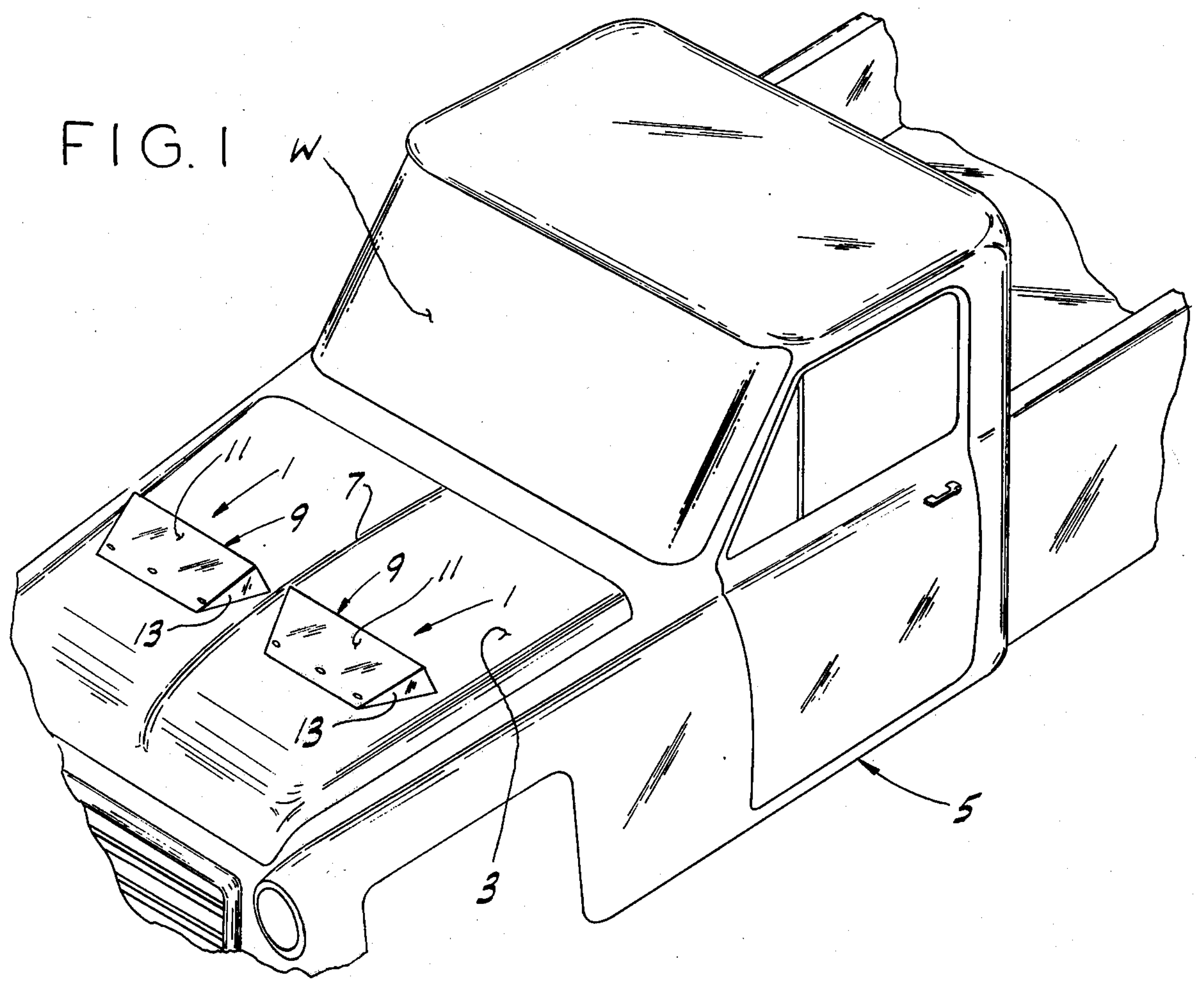
FIG. 1 is a perspective view of a vehicle, such as a pickup truck, illustrating a pair of air deflectors of the present invention mounted on the hood thereof for deflecting airborne particles up over and away from the windshield of the vehicle.
Figure 2:
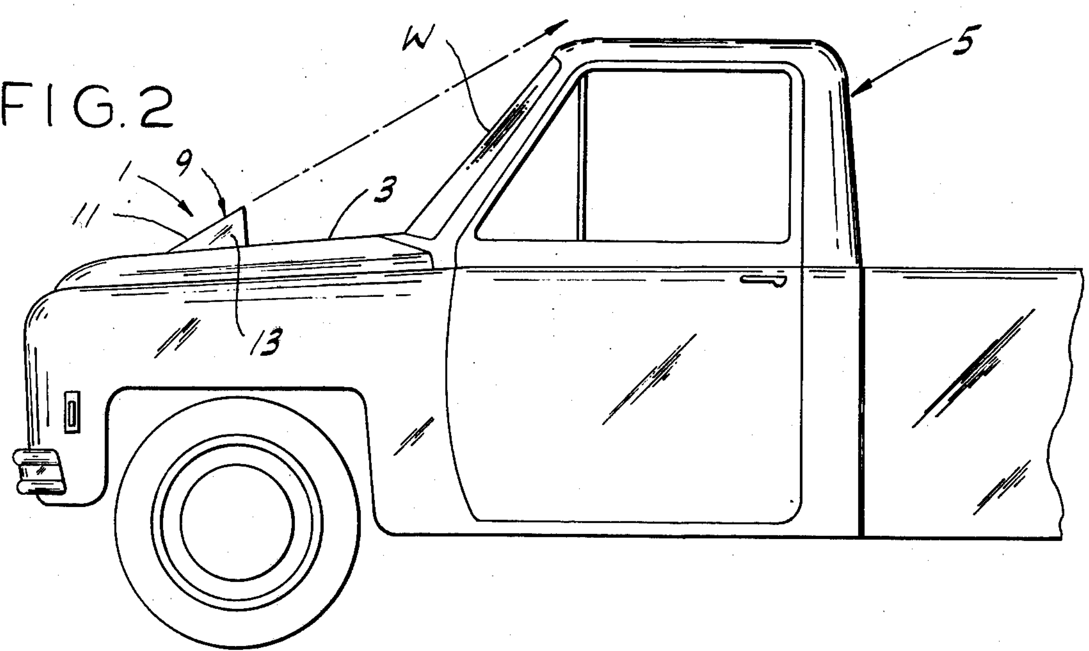
FIG. 2 is a side elevation of a portion of a pickup truck illustrating the deflectors of the present invention mounted thereon.
Figure 3:
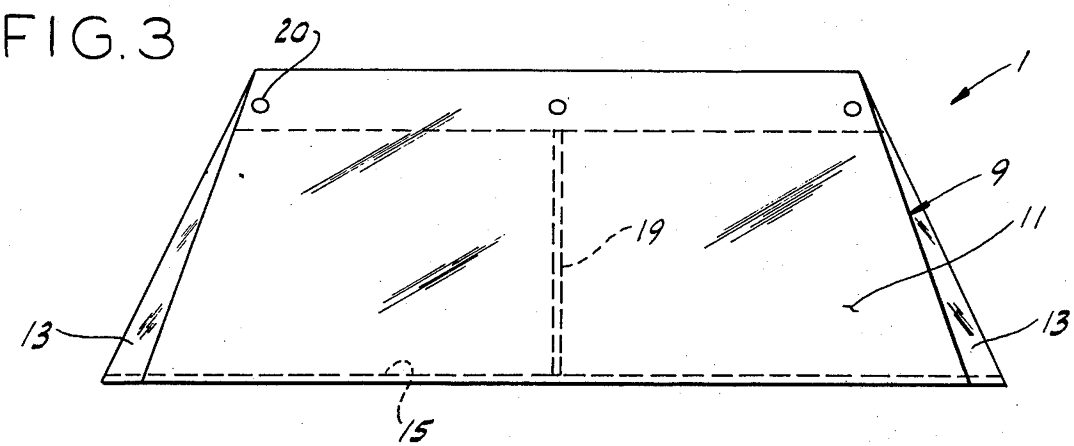
FIG. 3 is a plan view of a first embodiment of this invention.
Figure 4:
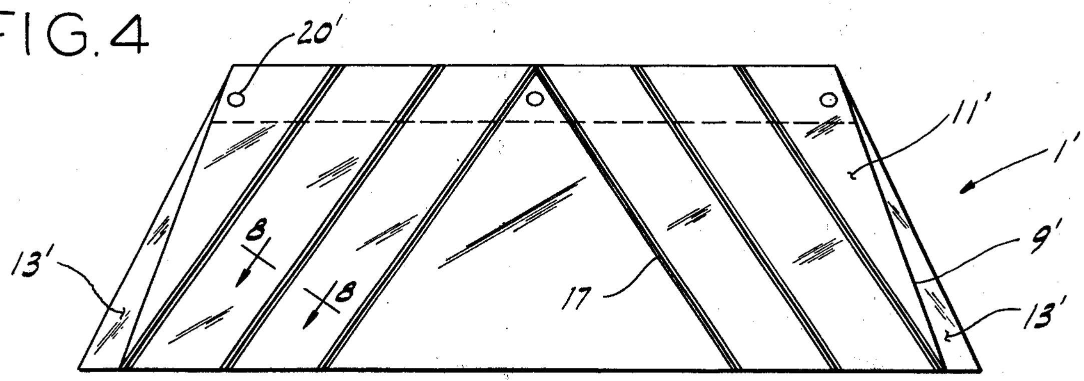
FIG. 4 is a plan view of a second embodiment of the air deflector of this invention.
Figure 5:
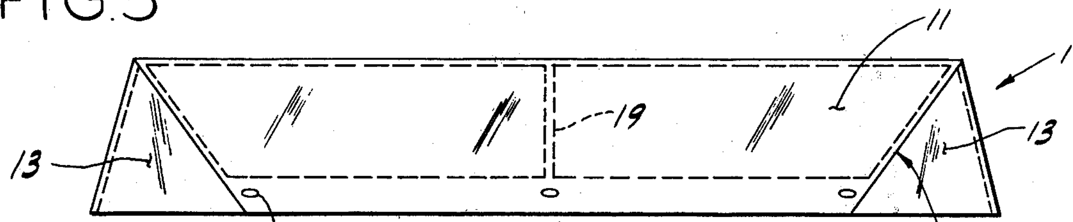
FIG. 5 is a front elevational view of the air deflector shown in FIG. 3.
Figure 6:
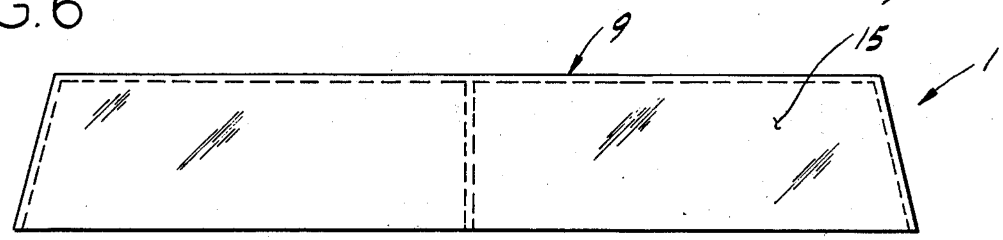
FIG. 6 is a rear end elevational view of the air deflector shown in FIG. 3.
Figure 8:
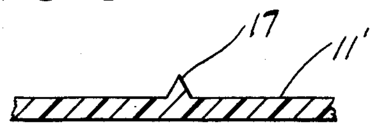
FIG. 8 is an enlarged vertical cross sectional view taken on line 8—8 of FIG. 4.

Referring now to the drawings, a pair of air deflectors of this invention, each designated in its entirety by reference character 1 in FIG. 1, is shown to be mounted on the forward portion of a hood 3 of a vehicle (e.g., a pickup truck) 5 with one deflector on each side of the longitudinal center line 7 of the hood. Each deflector 1 includes a member 9 of channel-shaped cross section (see FIG. 6) which extends across (i.e., transversely) of hood 3 for deflecting airborne particles (e.g., dust, insects, rain, road spray and the like) clear of windshield W of the vehicle. Member 9 is preferably molded of a suitable synthetic resin or thermoplastic material and, as shown in FIGS. 3 and 4, has a substantially planar top web 11 extending transversely of the hood and a pair of side flanges, each designated 13, extending lengthwise of the hood. As shown in FIGS. 1 and 2, web 11 of each deflector extends transversely of the hood a distance less than one-half the width of the hood. It is to be understood, however, that both deflectors are not necessary to the proper operation of this invention and that in place of the dual deflector arrangement shown in the drawings a single deflector of suitable width may be provided extending transversely across the hood of the vehicle to protect the windshield W of the vehicle from being impinged upon by airborne particles. The rear of the channel-shaped member 9 is shown to be closed by a rear end panel 15 (see FIG. 6). It is to be understood, however, that the rear end of the deflector need not be closed by an end panel for proper functioning of the air deflector of this invention and that the deflector 1 may be suitably left open at its rear.

Figure 7:
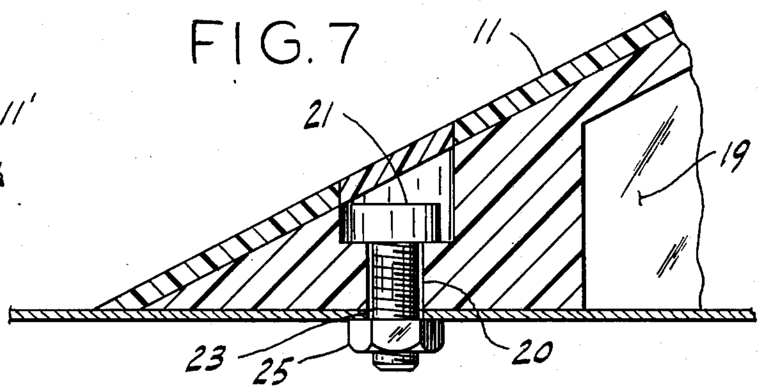
FIG. 7 is an enlarged partial vertical section taken on line 7—7 of FIG. 3.

As shown in FIG. 2, channel member 9 is secured to the forward portion of hood 3 in inverted position with its side flanges 13 engaging the hood and extending longitudinally thereof. The front edge of web 11 extends transversely of the hood and is contiguous to the hood (see FIG. 7) with the rear edge also extending transversely of the hood and being spaced above the hood such that the web constitutes a ramp angling up from front to rear. Deflector 1 is mounted on the hood in such a position and web 11 is angled at such a slope that a projection of the plane of the web (see FIG. 2) extends up over the top of the windshield. Thus, as vehicle 5 is driven forward, the airstream flowing over the hood is directed upwardly by web 11 over the windshield of the vehicle. As airborne particles encounter airstream S deflected upwardly by the deflector of this invention, the particles are carried upwardly by the airstream above the windshield W rather than impinging upon the windshield. This deflection of the airstream by the web also reduces wind pressure on the windshield and thus reduces the tendency of the airstream to lift windshield wiper blades away from the windshield at high speeds of the vehicle and thus improves wiper blade efficiency and safety of the vehicle. Although web 11 is shown to slope upwardly in FIG. 2 at approximately a 25° angle, it is to be understood that this angle will vary depending on the position of the deflector relative to the hood of the vehicle and the height of the vehicle windshield.

A second embodiment of deflector 1 is shown in its entirety in FIG. 4 and is indicated at 1' with its web 11' having a plurality of ribs together designated as 17 on its outer surface extending generally from front to rear for strengthening the web thereby to provide added stiffness to the deflector. More particularly, these ribs angle outwardly toward side flanges 13' and extend generally from the bottom front edge of the deflector toward the rear sides of the deflector for channelling water (i.e., rain), road spray and the like outwardly toward the side flanges where it is carried by the airstream either upwardly over the windshield or sidewise around the windshield. While ribs 17 are shown molded integrally with the web, it is to be understood that they may be separately fabricated and secured (i.e., bonded) thereto. As seen in FIG. 4, the width of web 11' increases from front to rear for deflecting a correspondingly greater portion of the airstream flowing along the hood and with the webs of deflectors on each side of the hood being relatively close together, the airstream is directed upwardly essentially across the entire width of the hood for shielding the entire windshield completely from airborne particles. It will be understood that ribs 17 are particularly beneficial for directing rain and other airborne liquid sprays or droplets sidewise out and away from the windshield at relatively low speeds.

Side flanges 13 which are preferably formed integrally with web 11 and provide support thereto, extend generally lengthwise of the hood. In order to provide additional strength and stability to the deflector, the side flanges slope outwardly away from each other as they extend from front to rear. This also provides a structure which may be nested one within the other for facilitating shipping. As shown in FIG. 3, a gusset 19 may be provided adjacent the longitudinal center line of the air deflector for supporting web 11 in its proper inclined position. Member 9 is secured to hood 3 in such manner as to permit the deflector to be readily removed from and mounted on the hood with no substantial modification or damage to the vehicle. More particularly, the front margin of the web is of sufficient thicknesses to accommodate holes 20 therein. Each hole is counterbored for receiving a bolt 21 which extends through the web and through a respective opening 23 in hood 3 where it is fixedly secured (i.e., bolted) to the hood by a nut 25 (see FIG. 7). Thus, the deflector is held immovably on the hood while the vehicle is driven at highway speeds, with the front portion of web 11 being fixedly secured to the hood and in contiguous relation thereto for preventing the deflector from being pushed rearwardly or from being lifted upwardly from the hood and with the rear portion of the web pressed down against the hood by the airstream striking the front face of the web. It will be noted that the low profile of the deflectors 1 does not substantially block the driver's view of the road. This is due in part to the fact that many present day vehicles have hoods which slope downwardly and forwardly thereby to permit the deflectors to be mounted on the hood as such so that its elevation is not substantially above the elevation of the hood and thus does not block the driver's view from the windshield.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An air deflector for deflecting airborne particles, such as dust, rain, insects, road spray and the like clear of the windshield of a vehicle comprising a member of channel shape in cross section having a substantially planar web and side flanges, said member being adapted to be mounted in inverted position on the hood of said vehicle with said side flanges engaging the hood and extending generally longitudinally thereof with one edge of said web constituting a front edge extending transversely of the hood and being contiguous thereto and with the other edge of the web constituting a rear edge extending transversely of the hood and being spaced above the hood so that said web constitutes a ramp angling upwardly from front to rear, said ramp being positioned on said hood and being angled at such a slope that a projection of the plane of said ramp extends up over the top of said vehicle windshield whereby as the vehicle is driven forwardly said airborne particles are deflected by said web up over the windshield, and said web having a plurality of ribs thereon extending generally from the front to the rear edge of the web, said ribs being on the outer surface of the web and angling outwardly toward the side flanges as they extend from the front to the rear edge of the web.

2. An air deflector as set forth in claim 1 further comprising a support for said web intermediate said side flanges engageable with said hood.

3. An air deflector as set forth in claim 1 wherein the width of said web increases from front to rear with said side flanges sloping upwardly and inwardly toward the center of said deflector so that the bottom of the deflector is wider than the top.

4. An air deflector for deflecting airborne particles, such as dust, rain, insects, road spray and the like clear of the windshield of a vehicle comprising a member of channel shape in cross section having a substantially planar web and side flanges, said member being adapted to be mounted in inverted position on the hood of said vehicle with said side flanges engaging the hood and extending generally longitudinally thereof with one edge of said web constituting a front edge extending transversely of the hood and being contiguous thereto and with the other edge of the web constituting a rear edge extending transversely of the hood and being spaced above the hood so that said web constitutes a ramp angling upwardly from front to rear, said ramp being positioned on said hood and being angled at such a slope that a projection of the plane of said ramp extends up over the top of said vehicle windshield whereby as the vehicle is driven forwardly said airborne particles are deflected by said web up over the windshield, the front margin of said web having holes spaced lengthwise thereof for receiving fasteners for securing said deflector to the hood.

* * * * *